(12) United States Patent
Gutsol et al.

(10) Patent No.: US 8,864,953 B2
(45) Date of Patent: Oct. 21, 2014

(54) CYCLONIC REACTOR WITH NON-EQUILIBRIUM GLIDING DISCHARGE AND PLASMA PROCESS FOR REFORMING OF SOLID HYDROCARBONS

(71) Applicant: Drexel University, Philadelphia, PA (US)

(72) Inventors: Alexander F. Gutsol, San Ramon, CA (US); Alexander Fridman, Philadelphia, PA (US); Anatoliy Polevich, Philadelphia, PA (US); Michael J. Gallagher, Philadelphia, PA (US)

(73) Assignee: Drexel University, Philadelphia, PA (US)

( * ) Notice: Subject to any disclaimer, the term of this patent is extended or adjusted under 35 U.S.C. 154(b) by 0 days.

(21) Appl. No.: 14/060,941

(22) Filed: Oct. 23, 2013

(65) Prior Publication Data

US 2014/0042368 A1    Feb. 13, 2014

Related U.S. Application Data

(60) Continuation of application No. 13/599,198, filed on Aug. 30, 2012, now Pat. No. 8,603,403, which is a division of application No. 12/176,118, filed on Jul. 18, 2008, now Pat. No. 8,361,404, which is a continuation of application No. 10/560,537, filed as application No. PCT/US2004/019590 on Jun. 18, 2004, now Pat. No. 8,110,155, said application No. 12/176,118 is a continuation of application No. 10/560,439, filed as application No. PCT/US2004/019589 on Jun. 18, 2004, now Pat. No. 7,867,457.

(60) Provisional application No. 60/551,725, filed on Mar. 10, 2004, provisional application No. 60/480,341, filed on Jun. 20, 2003, provisional application No. 60/480,132, filed on Jun. 20, 2003.

(51) Int. Cl.
*B01J 19/08* (2006.01)

(52) U.S. Cl.
USPC .......................................... 204/169; 204/168

(58) Field of Classification Search
USPC ................................................. 204/168, 169
See application file for complete search history.

(56) References Cited

U.S. PATENT DOCUMENTS

| 3,042,830 A | 7/1962 | Orbach |
| 3,344,051 A | 9/1967 | Latham, Jr. |

(Continued)

FOREIGN PATENT DOCUMENTS

| WO | WO 2004/112950 | 12/2004 |
| WO | WO 2005/004556 | 1/2005 |

*Primary Examiner* — Kishor Mayekar
(74) *Attorney, Agent, or Firm* — Baker & Hostetler LLP

(57) ABSTRACT

A reactor for reforming a hydrocarbon, and associated processes and systems, are described herein. In one example, a reactor is provided that is configured to use non-equilibrium gliding arc discharge plasma. In another example, the reactor uses a vortex flow pattern. Two stages of reforming are described. In a first stage, the hydrocarbon absorbs heat from the wall of the reactor and combusts to form carbon dioxide, carbon monoxide, and water. In a second stage, a gliding arc discharge is use to form syngas, which is a mixture of hydrogen gas and carbon monoxide. The heat generated by the combustion of the first stage transfers to the wall of the reactor and heated products of the second stage mix with incoming hydrocarbon to provide for partial recuperation of the reaction energy.

13 Claims, 7 Drawing Sheets

(56) References Cited

U.S. PATENT DOCUMENTS

| | | | |
|---|---|---|---|
| 4,217,132 A | 8/1980 | Burge et al. |
| 4,690,743 A | 9/1987 | Ethington et al. |
| 4,801,435 A | 1/1989 | Tylko |
| 4,851,722 A | 7/1989 | Zauderer |
| 4,927,298 A | 5/1990 | Tuszko et al. |
| 4,995,231 A | 2/1991 | Smith et al. |
| 4,995,805 A | 2/1991 | Hilliard |
| 5,116,488 A | 5/1992 | Torregrossa |
| 5,374,802 A | 12/1994 | Dorfman et al. |
| 5,425,332 A | 6/1995 | Rabinovich et al. |
| 5,437,250 A | 8/1995 | Rabinovich et al. |
| 5,486,269 A | 1/1996 | Nilsson |
| 5,847,353 A | 12/1998 | Titus et al. |
| 5,887,554 A | 3/1999 | Cohn et al. |
| 5,993,761 A | 11/1999 | Czernichowski et al. |
| 6,007,742 A | 12/1999 | Czernichowski et al. |
| 6,245,309 B1 | 6/2001 | Etievant et al. |
| 6,322,757 B1 | 11/2001 | Cohn et al. |
| 6,363,716 B1 | 4/2002 | Balko et al. |
| 6,396,213 B1 | 5/2002 | Koloc |
| 6,793,898 B2 | 9/2004 | Brown et al. |
| 7,622,693 B2 | 11/2009 | Foret |
| 7,867,457 B2 | 1/2011 | Gutsol et al. |

US 8,864,953 B2

CYCLONIC REACTOR WITH NON-EQUILIBRIUM GLIDING DISCHARGE AND PLASMA PROCESS FOR REFORMING OF SOLID HYDROCARBONS

CROSS REFERENCE TO RELATED APPLICATIONS

This application is a continuation of U.S. application Ser. No. 13/599,198, filed Aug. 30, 2012, which is a divisional application from U.S. application Ser. No. 12/176,118, filed Jul. 18, 2008, now U.S. Pat. No. 8,361,404, which is a continuation of U.S. application Ser. No. 10/560,537 filed Feb. 28, 2007, now U.S. Pat. No. 8,110,155, which claims priority to PCT Application No. PCT/US2004/019590 filed Jun. 18, 2004, which claims benefit of U.S. Application Nos. 60/551,725 filed Mar. 10, 2004 and 60/480,341, filed Jun. 20, 2003. U.S. application Ser. No. 12/176,118 is also a continuation of U.S. application Ser. No. 10/560,439 filed Jul. 24, 2006, now U.S. Pat. No. 7,867,457, which claims priority to PCT Application No. PCT/US2004/019589 filed Jun. 18, 2004 which claims benefit of U.S. Provisional Application No. 60/480,132 filed Jun. 20, 2003. Each of these references (applications and patents) is incorporated herein by reference in its entirety for all purposes.

FIELD OF THE INVENTION

The invention is in the field of the chemical conversion of materials using plasma.

BACKGROUND OF THE INVENTION

Synthesis gas is a gaseous mixture that contains various amounts of carbon monoxide and hydrogen. Synthesis gas, or syngas, is typically generated by the gasification of a carbon containing fuel into a gaseous product. There may be several uses for syngas, including the production of energy through combustion of the syngas as well as using the syngas as an intermediate for the production of chemicals such as synthetic petroleum.

Current methods of production of syngas may include partial oxidation, steam reforming, autothermal reforming and gasification of solid biomass and coal. These and other processes reform the solid hydrocarbon to produce syngas. However, current methods typically require relatively large amounts of energy input to maintain the process at a steady state. Solid hydrocarbons typically have a relatively low heat calorific value when undergoing partial oxidation. Thus, the energy released by the oxidation typically is insufficient to support the process. Further, a significant portion of the energy that is produced is typically lost because of design limitations.

There is a need for an improved way to efficiently reform solid hydrocarbons into the syngas.

SUMMARY OF THE INVENTION

In some embodiments, the invention concerns the use of a cyclonic reactor configured to support a non-equilibrium gliding discharge of plasma. The plasma acts as a catalyst, which may reduce the energy input required to stimulate the process.

In some embodiments, the input stream may be comprised of various components, including a solid hydrocarbon feedstock. In some embodiments, the input stream may also be comprised of an input gas such as air, oxygen, and/or steam.

In some embodiments, the invention concerns a two stage process using non-equilibrium plasma as a catalyst to partially oxidize hydrocarbons. In a first stage, the temperature of an incoming hydrocarbon feedstock is raised through absorption of heat from the wall of a conical reactor. The raising of the temperature causes a volatile release of gas from the hydrocarbon feedstock as well as partial combustion of the feedstock with non-volatile part remaining as ash. In a second stage, the gaseous products of the first stage are oxidized using non-equilibrium plasma as a catalyst.

In certain embodiments, the invention concerns a two stage partial oxidation process. In one embodiment, the first stage may be combustion of dispersed feedstock to produce gaseous products, such as gaseous hydrocarbons, CO, $CO_2$, and $H_2O$. Combustion of the dispersed feedstock occurs when the dispersed feedstock absorbs heat from the surface of the reactor and an incoming hot gaseous stream. In another embodiment, the second stage may involve plasma catalysis of the gaseous products of the first partial oxidation stage. The plasma is preferably used as a volume catalyst. Products of the second partial oxidation stage may comprise synthesis gas—$H_2$, CO, $N_2$, and remaining light hydrocarbons such as $CH_4$, $C_2H_2$, $C_2H_4$, $C_2H_6$.

In another embodiment, a portion of the products of the second stage of the two stage partial oxidation process may partially mix with the incoming hot gaseous stream comprising of air and/or steam.

In certain embodiments, the invention also concerns a two stage heat recuperation process. In the first stage, the input gas is preheated by an output stream of a reactor. The output stream may be the synthesis gas exhaust produced in the reactor. In some embodiments, a portion of the input gas may be used as the transport gas to transport the feedstock into the reactor. In some embodiments, a portion of the input gas may be directed to a swirl generator in the reactor, which introduces the gas into the reactor tangentially. The tangential input gas causes a swirling gaseous motion in the reactor, elongating and rotating a non-equilibrium plasma discharge as well as causing the feedstock to rotate in the reactor to increase the residence time of the feedstock in the reactor. In the second stage of the two stage heat recuperation process, combustion of the dispersed hydrocarbons heat up the conical surface of the reactor. Incoming dispersed hydrocarbons and the incoming gas absorb heat from the conical surface of the reactor.

In some embodiments, the invention concerns a plasma reactor configured to reform solid hydrocarbons by partial oxidation, steam reforming or autothermal reforming.

These and other features of the subject matter are described below.

BRIEF DESCRIPTION OF THE DRAWINGS

The foregoing summary, as well as the following detailed description of the subject matter is better understood when read in conjunction with the appended drawings. For the purposes of illustration, there is shown in the drawings exemplary embodiments; however, these embodiments are not limited to the specific methods and instrumentalities disclosed. In the drawings.

DETAILED DESCRIPTION OF ILLUSTRATIVE EMBODIMENTS

Figure 1:
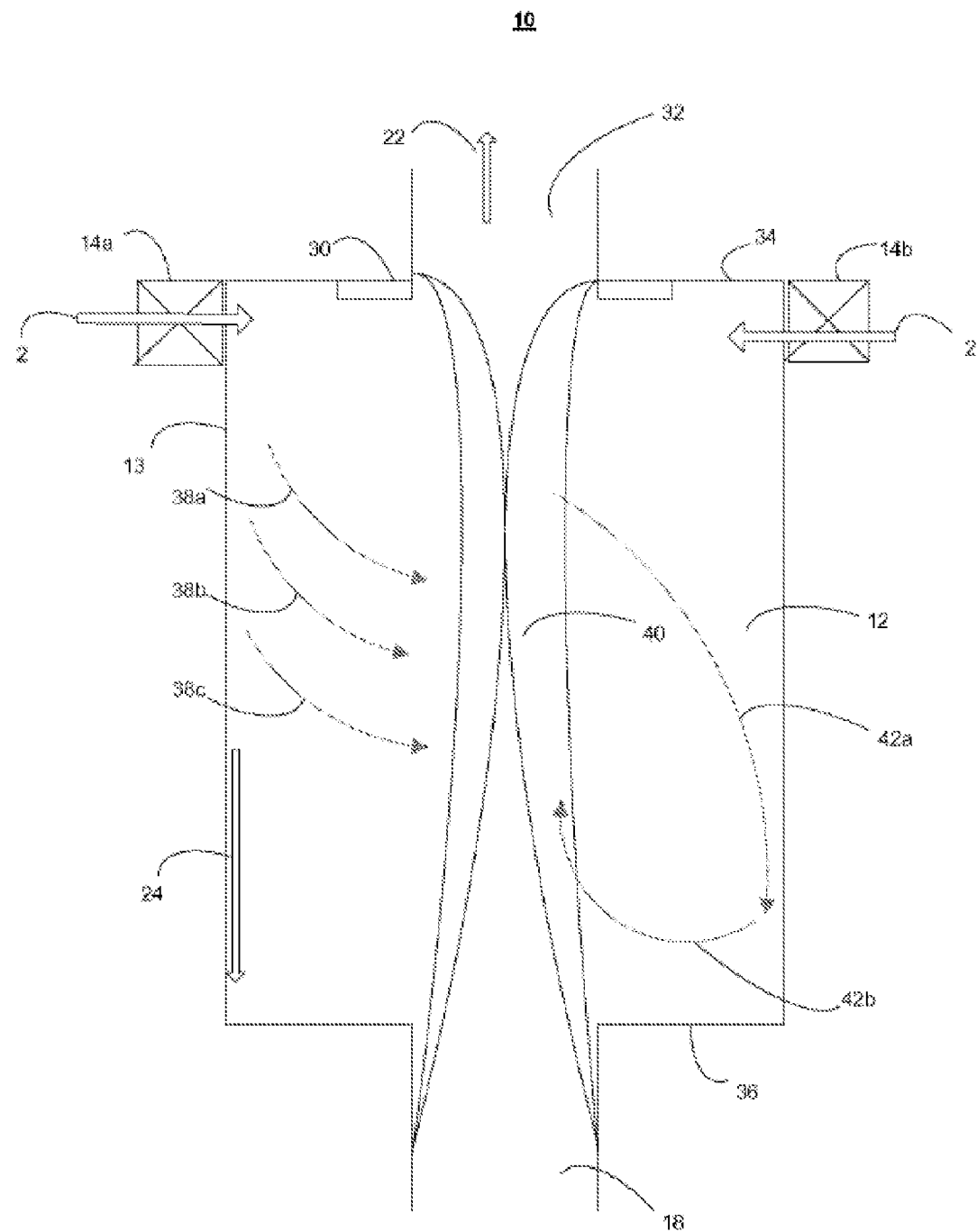
FIG. 1 is an exemplary illustration of a cyclonic reactor illustrating a reverse vortex flow.

Certain specific details are set forth in the following description and figures to provide a thorough understanding of various embodiments of the subject matter. Certain well-known details often associated with computing and software technology are not set forth in the following disclosure to avoid unnecessarily obscuring the various embodiments of the subject matter. Further, those of ordinary skill in the relevant art will understand that they can practice other embodiments of the subject matter without one or more of the details described below. Finally, while various methods are described with reference to steps and sequences in the following disclosure, the description as such is for providing a clear implementation of embodiments of the subject matter, and the steps and sequences of steps should not be taken as required to practice this subject matter.

A reactor configured to reform solid hydrocarbon feedstock and a process is provided for the production of synthesis gas. The reactor is configured to stimulate the process of partial oxidation or autothermal reforming through of a plasma. In one configuration, a non-equilibrium plasma is used.

Partial oxidation process has two primary stages: an exothermic stage of combustion and a slow endothermic stage of interaction of $CO_2$ and $H_2O$ with gaseous hydrocarbons. The reaction rate of the first stage may vary depending upon the state of the reacting hydrocarbon. In other words, the reaction rate of gaseous hydrocarbons in the first stage may be relatively fast when compared to the reaction rate of solid hydrocarbons. Thus, the residence time of the reactants in the reactor may be varied to maintain a consistent degree of conversion. On the second stage to increase H2 production the steam could be introduced. Partial oxidation and steam reforming reactions could be balanced to provide overall energy neutrality.

The present invention may be understood more readily by reference to the following detailed description taken in connection with the accompanying figures and examples, which form a part of this disclosure. It is to be understood that this invention is not limited to the specific devices, methods, applications, conditions or parameters described and/or shown herein, and that the terminology used herein is for the purpose of describing particular embodiments by way of example only and is not intended to be limiting of the claimed invention.

Also, as used in the specification including the appended claims, the singular forms "a," "an," and "the" include the plural, and reference to a particular numerical value includes at least that particular value, unless the context clearly dictates otherwise. The term "plurality", as used herein, means more than one. When a range of values is expressed, another embodiment includes from the one particular value and/or to the other particular value. Similarly, when values are expressed as approximations, by use of the antecedent "about," it will be understood that the particular value forms another embodiment. All ranges are inclusive and combinable.

The term "gliding arc" is used in the present subject matter as is understood by those skilled in the art. It should be understood that a plasma discharge in the present subject matter may be generated in various ways, for example, glow discharge. In a reactor implementing a glow discharge, a cathode current may be controlled mostly by the secondary electron emission, as occurs in glow discharge, instead of thermionic emission, as occurs in electrical arcs.

It is to be appreciated that certain features of the invention which are, for clarity, described herein in the context of separate embodiments, may also be provided in combination in a single embodiment. Conversely, various features of the invention that are, for brevity, described in the context of a single embodiment, may also be provided separately or in any subcombination. Further, references to values stated in ranges include each and every value within that range.

In the present disclosed subject matter, a gliding arc discharge plasma source is used to cause the partial oxidation of a hydrocarbon. A gliding arc discharge reactor is configured to cause a high-voltage electrical discharge to glide over the surface of one or more electrodes. The properties of the plasma discharge may be adjusted depending upon the configuration of the reactor. The reactor of the present example may be further configured to utilize a reverse-vortex flow pattern. Reverse vortex flow means that the vortex flow has axial motion initially from a swirl generator to a "closed" end of reaction chamber.

Referring now to the drawings, wherein like reference numerals designate corresponding structure throughout the views, and referring in particular to FIG. 1, a schematic view of an exemplary reactor, reactor 10, is illustrated. It should be noted that the shape and size of reactor 10 may vary. For example, reactor 10 may be generally conical or cylindrical in shape. Reactor 10 includes reaction chamber 12. At or near top 34 of reactor 10, there is a swirl generator, one or more nozzles 14a, 14b, that cause rotation of the fluids in reaction chamber 12. Rotation of the fluids in reaction chamber 12 may be caused by various ways. In the present embodiment, nozzles 14a and 14b may be tangential nozzles that introduce input fluid 2 into reaction chamber 12 tangentially. This present embodiment is for illustrative purposes only, as the rotation may be caused by other means, such as baffles inside of reaction chamber 12. Further, in some embodiments, input fluid 2 may be introduced into reaction chamber 12 at or near sonic velocity having mostly the tangential component of the velocity vector. Input fluid 2, in the present example, may be an input fluid comprising solid hydrocarbons.

Figure 2:
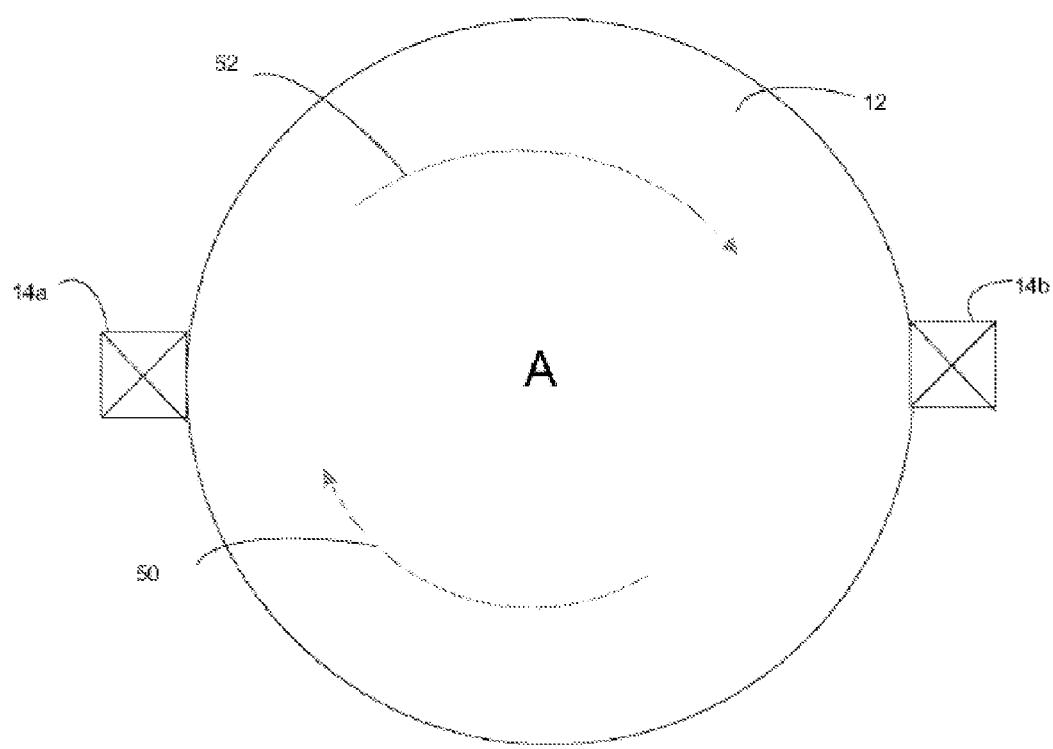
FIG. 2 is an exemplary illustration of a cyclonic reactor illustrating a vortex flow as seen from the top to the bottom of the reactor.

FIG. 2 further illustrates the rotation of the fluids inside reaction chamber 12. Reactor 10 reaction chamber 12 has axis "A" that extends from the top (not shown), such as top 34 of reactor 10 to the bottom (not shown), such as bottom 36, of reactor 10. In the present embodiment, a rotational flow is generated by nozzles 14a and 14b introducing input fluid (not shown) into reaction chamber 12 tangential to axis "A". A general flow pattern is caused whereby the fluids in the reactor rotate about axis "A", shown by exemplary fluid flows 50 and 52.

It should also be understood that, although the reactor 10 of FIG. 1 is shown as having top 34 and bottom 36, reactor 10 may be arbitrarily oriented in space, and the significance of the spatial orientation of top 34 and bottom 36 are merely to provide reference points to illustrate the exemplary embodiment of reactor 10.

In one embodiment, input fluid 2 may be an input stream of air or other gas and solid hydrocarbons. It should be understood that input fluid 2 may also have substances or compounds other than air and hydrocarbons. The present subject matter is not limited to input fluid 2 being a pure fluid input, but rather, discusses the partial oxidation of the hydrocarbon component of input fluid 2.

Referring back to FIG. 1, nozzles 14a, 14b that help to generate a rotation of the fluids in reactor 10 may be located about a circumference of vortex reactor 10 and are preferably spaced evenly about the circumference. Although two nozzles, 14a, 14b, are illustrated in FIG. 1, it should be understood that this configuration is an exemplary configuration and that reactor 10 may have one nozzle or more than two nozzles, depending upon the configuration. In other embodiments, additional nozzles, not shown, may be placed in various locations on reactor 10. Additionally, it should be understood that one or more nozzles may be used to introduce one or more input fluids into reaction chamber 12. In the present embodiment, reactor 10 has input fluid 2 and two output streams, output stream 22 and output stream 24. Output stream 22 is preferably stream comprising synthesis gas, i.e. hydrogen and carbon monoxide, as well as other gases such as nitrogen if air is input into the reactor. Output stream 24 is preferable primarily composed of solid reaction products such as ash. It should be understood that output streams 22 and 24 may not be pure but may contain other compounds because of impurities in input fluid 2 or incomplete oxidation and/or separation of the solid reaction products from the gaseous reaction products in the chamber. For example, in output stream 22, ash may be present that may require the installation of one or more filters further downstream.

Input fluid 2 is introduced to reaction chamber 12 via nozzles 14a, 14b, the outputs of which are preferably oriented tangential relative to wall 13 of reaction chamber 12, as shown by FIG. 2, which is a topside illustration of reactor 10. As shown in FIG. 2, reactor 10 has nozzles 14a and 14b. Input fluid 2 exits nozzles 14a and 14b and enters reaction chamber 12 in a generally tangential direction about an axis, such as axis "A" as illustrated in FIG. 2.

By introducing input fluid 2 in this manner, as discussed above, a rotational force is imparted upon the fluids in reaction chamber 12, thus causing a rotation of the fluids in reaction chamber 12 in a clockwise direction in this embodiment. Thus, the velocity at which input fluid 2 enters reaction chamber 12 effects the rotational speed of the contents in reaction chamber 12. It should be noted that the input direction may be in a direction reverse to that shown in FIG. 2. Further, it should be understood that one or more nozzles may be configured to introduce the input fluid in a direction dissimilar to other nozzles.

Referring back to FIG. 1, in an embodiment of the present subject matter, flange 30 and circular opening 32, located substantially at the center of flange 30, assist to form a vortex flow. In the present embodiment, the vortex flow is a reverse vortex flow, though it should be understood that the vortex flow may be a forward vortex flow.

Figure 3:
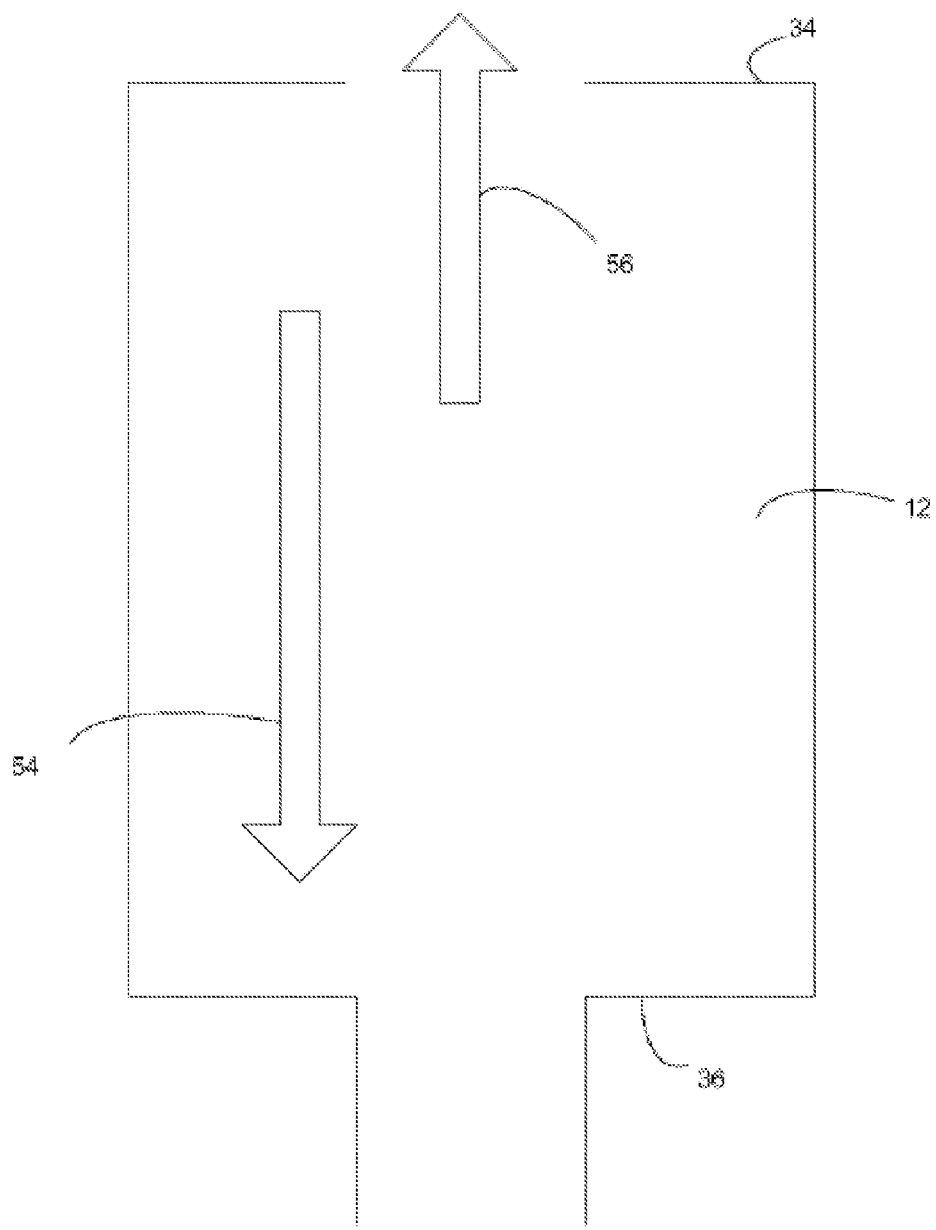
FIG. 3 is an exemplary illustration showing a reverse vortex flow.

FIG. 3 is provided to illustrate a reverse vortex flow pattern. Reactor 10 has top 34 and bottom 36. Reaction chamber 12 has two general flow patterns, exemplary flow 54 and exemplary flow 56. It should be understood that these flow patterns are one component of the flow of reactants and/or reaction products in reaction chamber 12, with the rotational flow pattern being the other component. Generally in reactor 10, components flow in a downward motion from top 34 to bottom 36 outside near the outer wall of reactor 10 and in an upward motion from bottom 36 to top 34 near the center of reactor 10, as shown in FIG. 3. It should be understood that other flow patterns may be used.

Referring back to FIG. 1, opening 32 in flange 30 is preferably circular, but may be other shapes such as pentagonal or octagonal. The size of circular opening 32 may be varied to configure reactor 10 for various flow patterns in reaction chamber 12. In this present embodiment, for example, the diameter of opening 32 in flange 30 may be from approximately 70% up to 95% of the diameter of reaction chamber 12 to form the reverse vortex flow.

The diameter of opening 32 may also be configured to establish, or prevent, a recirculation zone from forming. Reactor 10 may be configured to provide a way in which relatively hot fluids flowing from plasma region 40 may exchange a portion of their heat with fluids flowing to plasma region 40. For example, exemplary fluids 38a-c, which are flowing generally towards plasma region 40 receive heat from exemplary fluid 42a, which is flowing from plasma region 40. Exemplary fluid 42a, after exchanging heat with exemplary fluids 38a-c, may than flow back to plasma region 40, as shown by exemplary fluid 42b. Thus, a portion of the reaction heat generated in plasma region 40 and a portion of fluids in reaction chamber 12 recirculate within reactor 10. In one embodiment, if a recirculation zone is desired, the diameter of opening 32 in flange 30 may be approximately 10% up to 75% of the diameter of reaction chamber 12.

As discussed above, reverse vortex flow as used herein means that the vortex flow has axial motion initially caused by nozzles 14a and 14b along wall 13 of the chamber and then the flow turns back and moves along the axis to the "open" end of the chamber towards opening 32. An example in nature of this flow pattern may be similar to the flow inside a dust separation cyclone, or inside a natural tornado. Input fluid 2 travels in a circular motion, traveling in a downward and inward direction towards plasma region 40, as shown by exemplary fluids 38a-c.

A reverse vortex flow in reaction chamber 12 causes the contents of reactor 10 in reaction chamber 12 to rotate around plasma region 40, while output stream 22 travels in a direction upwards from the bottom of reactor 10 to opening 32. Along with other benefits that may not be explicitly disclosed herein, the rotation may provide necessary time for the heating of the contents flowing to and in the relatively hot plasma region 40 as the contents move downwardly around plasma region 40. Another benefit of the rotation may be that the reverse vortex flow may increase the residence time of reactants and products inside reaction chamber 12.

A vortex flow, such as the reverse-vortex flow described in FIG. 1, may provide for several benefits, some of which may not be explicitly described herein. For example, the flow may cause one two or more zones inside chamber 12, one being plasma region 40, the other being the remaining volume of reaction chamber 12. For example, in the present subject matter, a temperature differential is established between plasma region 40 to wall 13 of reactor 10. A central axis in plasma region 40 may have the highest temperature in reaction chamber 12, and as the radial distance from that central axis increases to wall 13, the temperature may decrease.

Figure 4:
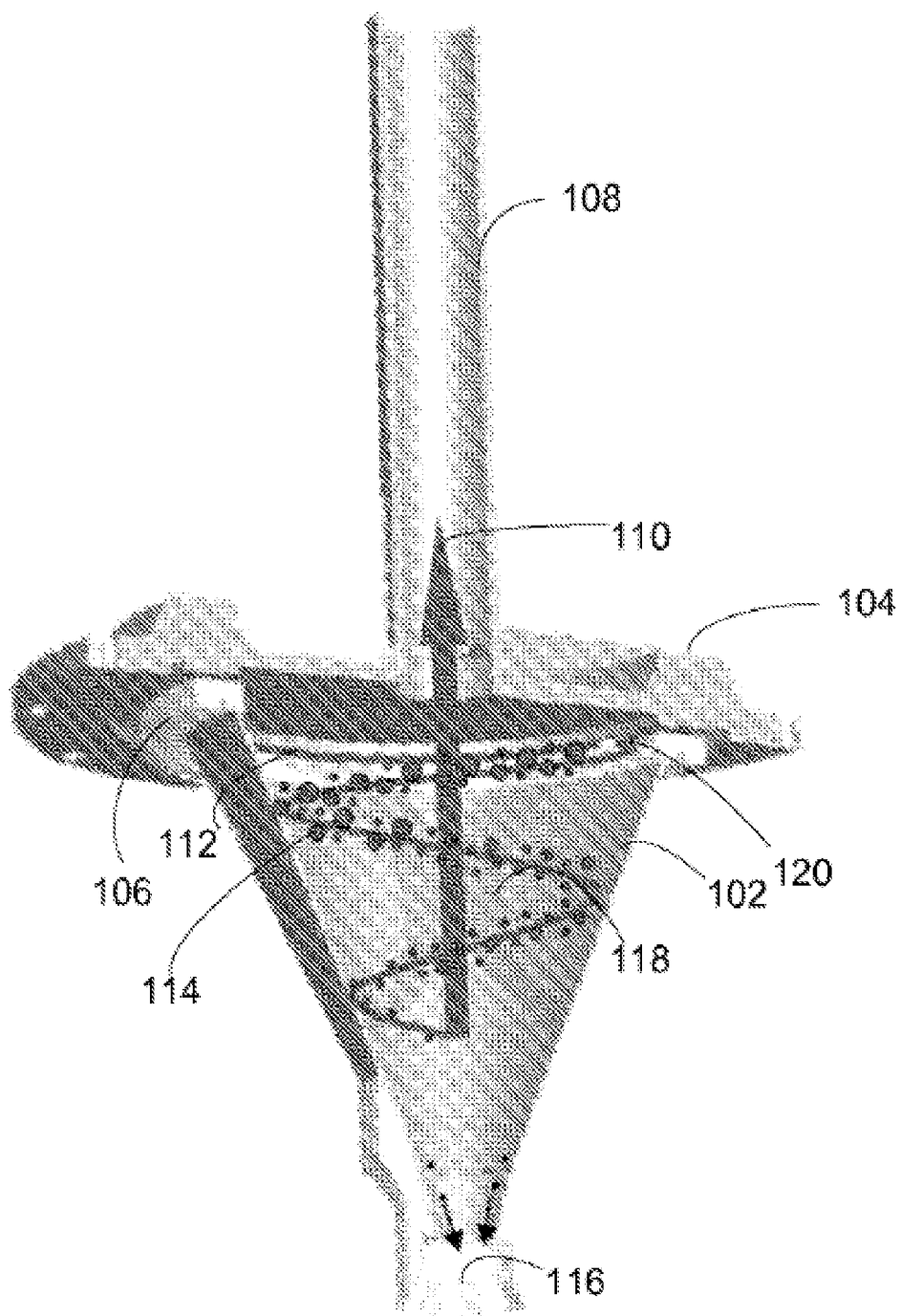
FIG. 4 is an illustration of a reactor configured to reform hydrocarbon feedstock.

FIG. 4 is an illustration of an exemplary reactor 100 that may be used to reform hydrocarbons. In the present example, reactor 100 is a cyclonic reactor of conical shape that uses gliding arc discharge plasma 118 to partially oxidize the hydrocarbons. Reactor 100 has conical bottom portion 102 that serves as a first electrode. Bottom portion 102 may be shaped and configured to manipulate the flow of contents in reactor 100 to provide for a certain residence time. By adjusting the residence time of reactor 100, solid phase pre-heating of solid particle 114 in input fluid 120 may occur.

Reactor 100 also has circular lid 104 that serves as a second electrode. Lid 104 is configured to have output 108 that provides for the exhaust of gaseous products 110. Lid 104 and bottom portion 102 may be separated by an insulator, such as insulator 106. Insulator 106 may be constructed from various materials, including plastic and ceramic. In the present example, insulator 106 is a ceramic. To provide for the rotation of the contents of reactor 100, reactor 100 may also have swirl generator 112, which in the present embodiment is a series of tangential slits located between lid 104 and insulator 106. When a solid hydrocarbon partially oxidizes, a product of the reaction may include ash, or the solid remains of an oxidation reaction. Although a portion of the ash may be light enough to travel to output 108 as a product of gaseous product 110, the portion of the ash that is heavier may travel downward from the central part of reactor 100 to outlet 116.

Figure 5:
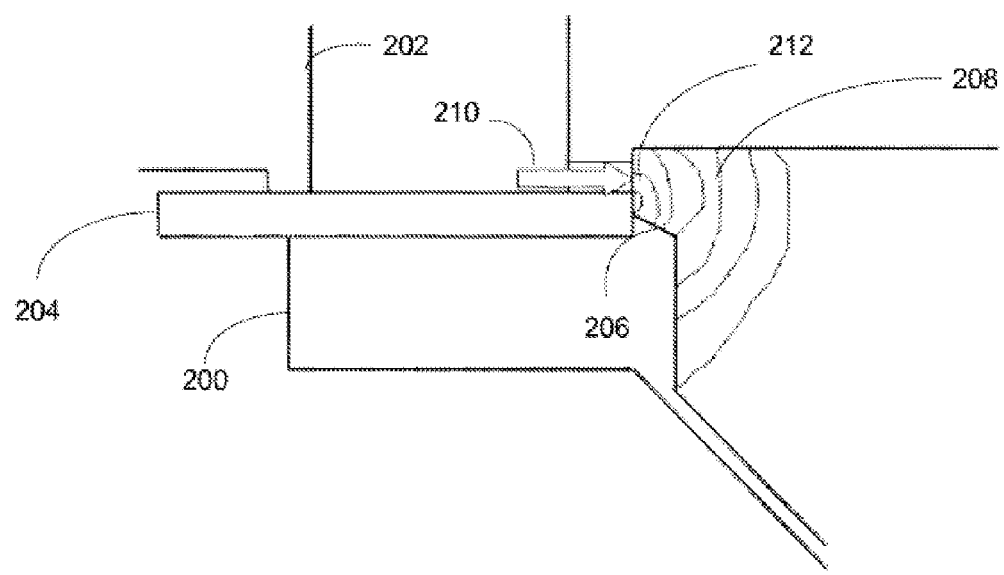
FIG. 5 is an illustration of the breakdown region of a reactor configured to partially oxidize hydrocarbon feedstock.

FIG. 5 illustrates how a gliding arc discharge plasma, such as plasma 118 of reactor 100, may be created. Shown in FIG. 5 is a cross section of a reactor, similar in configuration to reactor 100 of FIG. 4. High voltage from a power supply (not shown) is applied between lid 202 and bottom portion 200. The voltage would preferably be high enough (about 3 kV/mm for atmospheric pressure air at room temperature) to initiate breakdown in the smallest gap, shown as gap 212, between lid 202 and bottom portion 200. To ensure breakdown in front of incoming tangential plasma air jet 210, bottom portion 200 may be configured and shaped to have lip 206, which may further decrease the size of gap 212.

Plasma channel 208 formed as a result of the breakdown may be elongated by incoming tangential plasma air jet 210, which rotates and moves from the periphery of a reactor, such as the reactor shown in FIG. 5, down and to a central axis, such as axis "A" of FIG. 2. As a result of this elongation, plasma channel 208 may also rotate very fast (usual rotation frequency is tens of Hertz) and move to a central axis, such as axis "A" of FIG. 2. The discharge may extinguish as a result of the elongation. If the discharge does extinguish, the discharge may occur again in the smallest gap between the electrodes. This causes a gliding arc discharge. It should be noted that the discharge may also exist as a continuous voltage gliding discharge in a (reverse vortex) tornado flow. In the present example, if current is low (usually below 1 A), the voltage is high (several kV), bottom portion 200 may operate in the mode of the secondary electron emission. In that example, the surface of bottom portion 200 preferably acts as a cathode.

Figure 6:
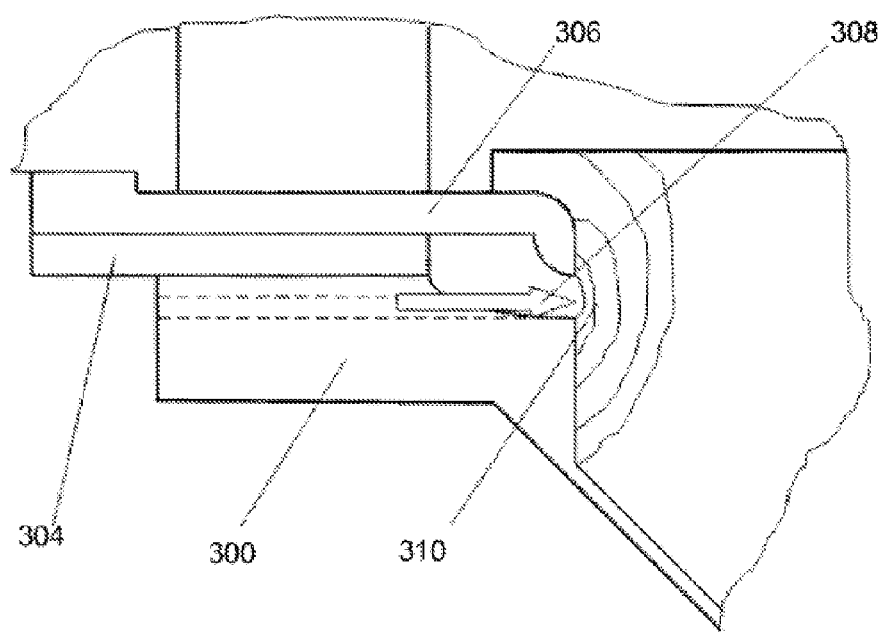
FIG. 6 is an illustration of an alternate plasma breakdown region of a reactor configured to partially oxidize hydrocarbon feedstock.

To reduce the likelihood of the insulator, such as insulator 204 of FIG. 5, from cracking due to direct exposure to the plasma discharge and thermal shock, insulator 204 of FIG. 5, may be moved away from the discharge of the plasma, as shown in FIG. 6. Insulator 304 is located between lid 306, which in the present embodiment may be configured to act as a ground electrode or anode, and bottom portion 300, which in the present embodiment may be configured to act as a cathode. Bottom portion 300, lid 306 and insulator 304 are shaped and configured to provide for plasma breakdown region 310, which is located away from insulator 304. Additional cooling for insulator 304 may be provided by incoming stream 308.

Figure 7:
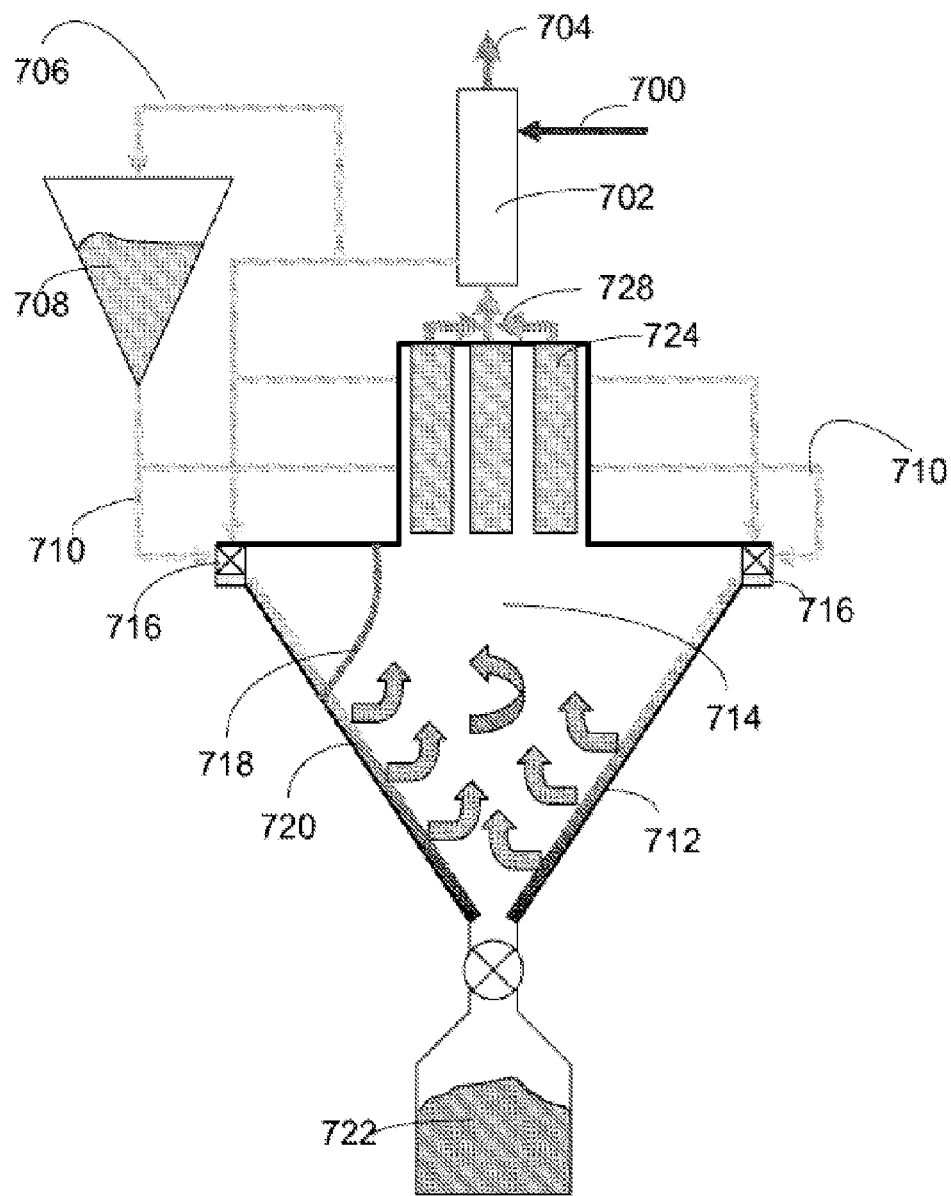
FIG. 7 is an illustration of a system for reforming of hydrocarbon feedstock.

FIG. 7 is illustrative of a sample process for partially oxidizing hydrocarbons using a gliding arc discharge and reverse-vortex flow pattern. Initial reagents for the process may be a gaseous oxidant (for example air or oxygen) and dispersed solid hydrocarbons (for example, powder of peat, corn flour or coal). Gaseous oxidant 700 is preheated in heat exchanger 702, receiving heat from synthesis gas exhaust 728, which in turn cools gas exhaust 728. In the present example, this is the first stage of heat recuperation. A portion of gas exhaust 728 may be separated and used as a transport gas 706, with the remaining portion of gas exhaust 728 exiting the process as product stream 704.

Transport gas 706 is mixed with feedstock 708. The contents of feedstock 708 may vary, but in the present embodiment, feedstock 708 is a solid hydrocarbon configured for transport via a gas, e.g. the particles of feedstock 708 are of a size sufficient to be moved by transport gas 706. Transport gas 706 may be supplemented with air or other gases to increase the oxygen content of transport gas 706. Further, in other examples, transport gas 706 may not be derived from product stream 704, but instead, may be a wholly separate gas stream. Input stream 710, which is a mixture of transport gas 706 and feedstock 708, is introduced into reactor 712 reaction space 714 via swirl generator 716 and enters reaction space 714 tangentially. As discussed in FIG. 5 and FIG. 6 above, input stream 710 preferably elongates and rotates gliding arc discharge 718 and also provides high intensity rotation to the particles in feedstock 708.

As the particles of feedstock 708 travel in circular direction proximate to inner surface of wall 720 of reactor 712, the particles in feedstock 708 oxidize, or combust in an exothermic reaction. The energy released in the partial oxidation heat up the inner surface of wall 720. This released heat may be absorbed by other particles from feedstock 708 in input stream 710 as well as transport gas 706 of input stream 710. The heating of feedstock 708 in input stream 710 results in volatiles release and causes combustion, with some resulting products being CO, $CO_2$, $H_2O$ and uncombusted hydrocarbons. This is the first stage of the partial oxidation process. A further product of the release may be solid products such as ash that moves downwards and collects in ash bunker 722.

Gaseous products of the first stage, e.g. hydrocarbons, CO, $CO_2$ and $H_2O$, flow towards the central part of reactor 712 where the second stage of the process takes place with the help of plasma catalysis. In the present example, plasma catalysis may means that plasma is used as a volume catalyst, and does not provides a major portion of the energy of the process. Plasma may help ensure a high rate of reaction of the secondary stage and may help to reduce or prevent the formation of ash. A preferable product of the secondary stage is synthesis gas, which is a mixture of $H_2$ and CO, and $N_2$ if nitrogen is a component of input stream 710. The products of the secondary stage may partially mix with input stream 710, which may accelerate the overall process. In order to increase the H2 content the steam could be introduced on second stage.

A portion of the products of the second stage exhausts from reactor 712 through filter bank 724, which may help to separate solid particles, such as ash, resulting in product stream 704. Product stream 704 may be used as a gaseous fuel or as a feedstock for organic synthesis, for example, of liquid fuels using the Fischer-Tropsch process.

While the embodiments have been described in connection with the preferred embodiments of the various figures, it is to be understood that other similar embodiments may be used or modifications and additions may be made to the described embodiment for performing the same function without deviating therefrom. Therefore, the disclosed embodiments should not be limited to any single embodiment but rather should be construed in breadth and scope in accordance with the appended claims.

What is claimed:

1. A method for reforming solid hydrocarbons in a reactor, comprising:

providing at least a portion of a solid hydrocarbon feedstock in a location proximate to a surface of a bottom conical section of the reactor, wherein heat is transferred from the bottom conical section of the reactor to the solid hydrocarbon feedstock;

partially combusting at least a portion of the solid hydrocarbon feedstock to produce a composition comprising a hydrocarbon fluid; and plasma catalyzing the hydrocarbon fluid using a non-equilibrium plasma to produce an outlet stream.

2. The method of claim 1, wherein the surface of the bottom conical section of the reactor is at least partially heated by energy released by the partial combustion of the solid hydrocarbon feedstock.

3. The method of claim 1, further comprising transferring heat to the solid hydrocarbon feedstock by contacting the at least a portion of the solid hydrocarbon feedstock with an incoming gaseous stream.

4. The method of claim 3, wherein the incoming gaseous stream is heated by thermal contact with the outlet stream.

5. The method of claim 1, wherein the composition further comprises carbon monoxide, carbon dioxide, or a combination thereof.

6. The method of claim 1, wherein partially combusting at least a portion of the solid hydrocarbon feedstock further produces water.

7. The method of claim 1, wherein the outlet stream comprises hydrogen and carbon monoxide.

8. The method of claim 7, wherein the outlet stream further comprises nitrogen.

9. The method of claim 7, wherein the outlet stream further comprises a solid hydrocarbon byproduct.

10. The method of claim 1, wherein the non-equilibrium plasma is generated by:

applying high voltage potential between a first electrode and a second electrode, wherein the first electrode is a bottom conical section of the reactor, and wherein the second electrode is a top section of the reactor.

11. The method of claim 10, wherein the bottom conical section and the top section are electrically isolated by an insulator.

12. The method of claim 11, wherein the insulator is ceramic, glass or plastic.

13. The method of claim 11, further comprising cooling the insulator with an incoming gaseous stream.

* * * * *